US006293434B1

(12) United States Patent
Ellis et al.

(10) Patent No.: US 6,293,434 B1
(45) Date of Patent: Sep. 25, 2001

(54) APPARATUS FOR DISPENSING OF BULK PRODUCT

(75) Inventors: M. Jeffrey Ellis, Wesley Hills; Stuart Sklovsky, Montebello, both of NY (US); Silvio J. DiMarchi, Leonia; Jack Wuensch, Hackensack, both of NJ (US)

(73) Assignee: Mars, Inc., McLean, VA (US)

( * ) Notice: Subject to any disclaimer, the term of this patent is extended or adjusted under 35 U.S.C. 154(b) by 0 days.

(21) Appl. No.: 09/573,478

(22) Filed: May 16, 2000

Related U.S. Application Data

(62) Division of application No. 09/062,506, filed on Apr. 20, 1998, now Pat. No. 6,062,438.

(51) Int. Cl.[7] .......................... G01F 11/24

(52) U.S. Cl. .......................... 222/135; 222/78; 222/181.3; 222/349; 222/352; 222/413; 40/331; 198/671

(58) Field of Search .......................... 222/78, 412, 413, 222/349, 352, 192, 185.1, 181.2, 181.3, 132, 135; 40/331; 198/548, 671; 312/216, 217, 221, 35; 211/79, 151

(56) References Cited

U.S. PATENT DOCUMENTS

| | | | | |
|---|---|---|---|---|
| Re. 36,134 | * | 3/1999 | Stein | 211/133.1 X |
| 359,347 | | 3/1887 | Cox | 222/413 X |
| 600,849 | | 3/1898 | Brown | 40/331 |
| 1,529,379 | | 3/1925 | Thompson | 222/413 |
| 1,787,671 | | 1/1931 | Daniels, Sr. | 198/671 X |
| 2,279,613 | | 4/1942 | Blue | 222/272 |
| 2,652,026 | | 9/1953 | Iddings | 222/413 X |
| 2,867,314 | | 1/1959 | Hansen | 198/671 X |
| 3,251,453 | | 5/1966 | Robson, Jr. | 196/671 X |
| 3,361,509 | * | 1/1968 | Levenberg | 312/216 X |
| 3,378,321 | * | 4/1968 | Frederick et al. | 312/221 X |
| 3,705,644 | | 12/1972 | Kawchitch | 198/664 |
| 4,136,803 | | 1/1979 | Tobias et al. | 222/413 |
| 4,220,434 | | 9/1980 | Letzig | 198/671 X |
| 4,592,494 | | 6/1986 | Ellis et al. | 222/252 |
| 4,718,578 | | 1/1988 | Radek et al. | 222/108 |
| 4,802,609 | | 2/1989 | Morse et al. | 222/413 X |
| 4,964,535 | | 10/1990 | Curwen | 222/349 X |
| 5,119,942 | * | 6/1992 | McCullars | 211/151 X |
| 5,944,201 | * | 8/1999 | Babboni et al. | 211/151 |
| 6,062,438 | * | 5/2000 | Ellis et al. | 222/349 |

* cited by examiner

*Primary Examiner*—Kenneth Bomberg
(74) *Attorney, Agent, or Firm*—Fitzpatrick, Cella, Harper & Scinto

(57) ABSTRACT

A bulk vending apparatus for dispensing a user-determined amount of product includes a rack unit having a plurality of support structures capable of extending out from the rack unit, a plurality of dispensing units each containing a product for dispensing and arranged on the support structures and including restraining means to restrain all but a first support structure of the plurality of support structures when a first support structure is extended from the rack unit.

8 Claims, 10 Drawing Sheets

FIG. 7
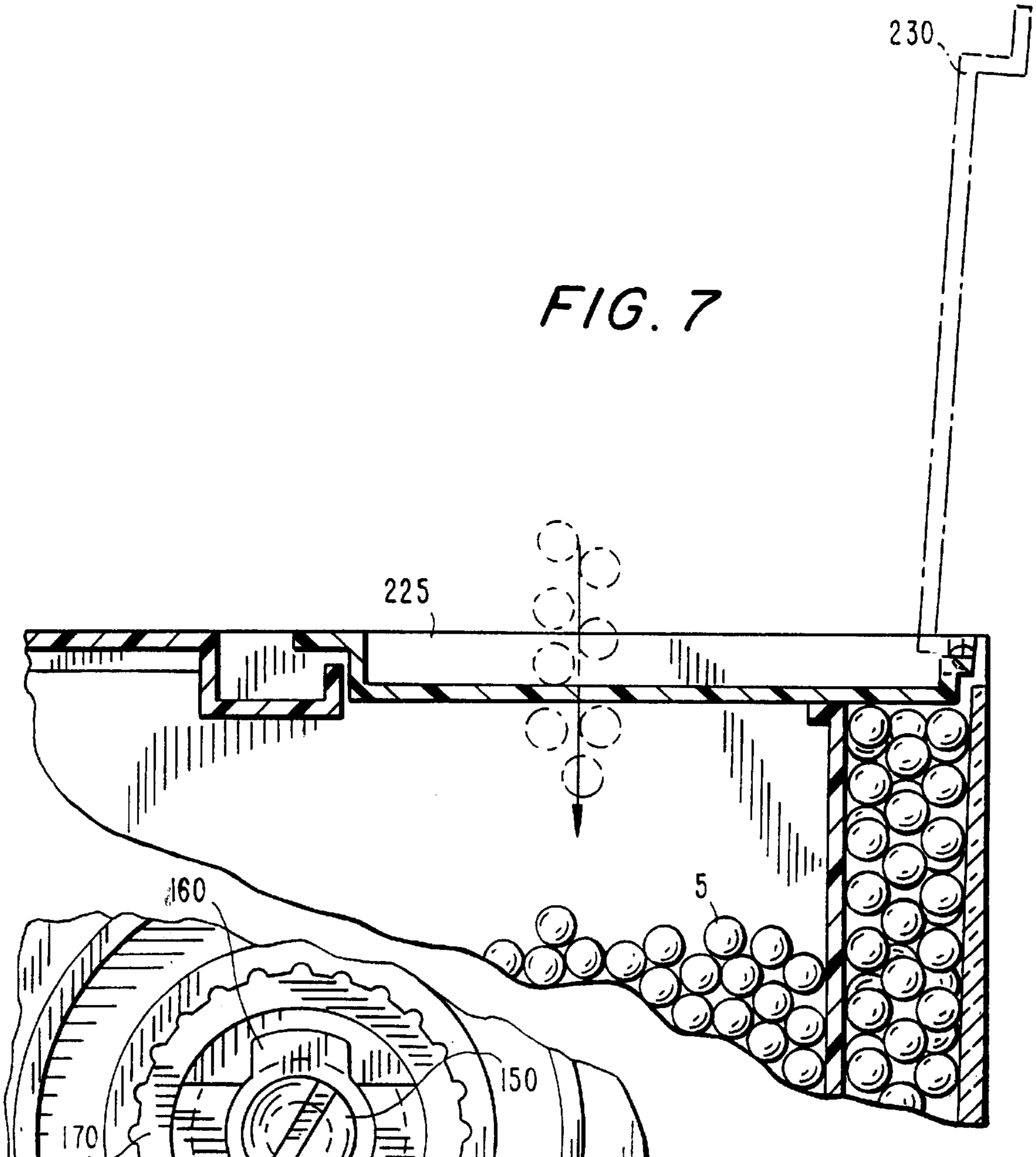
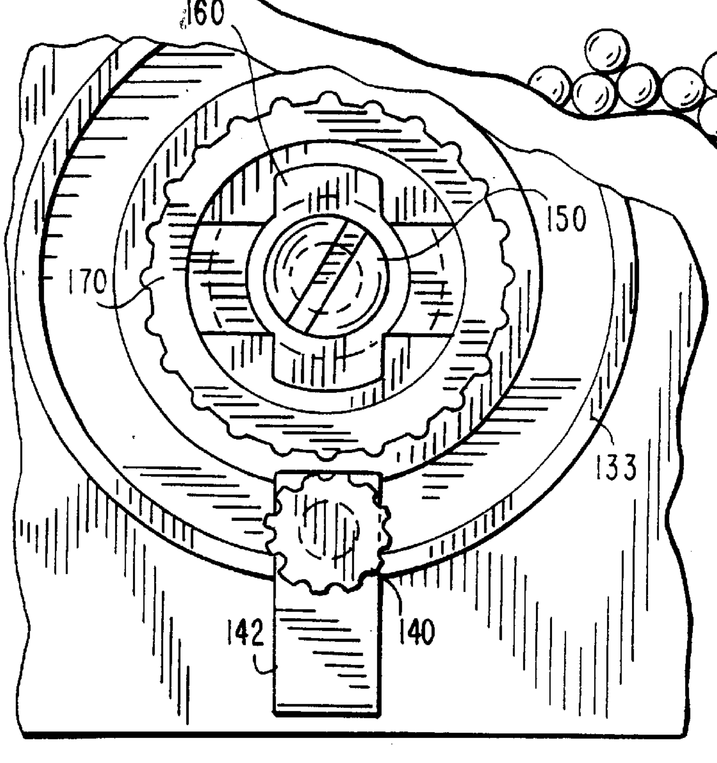
FIG. 8

APPARATUS FOR DISPENSING OF BULK PRODUCT

This is a divisional application of parent application Ser. No. 09/062,506, filed Apr. 20, 1998 now U.S. Pat. No. 6,062,438.

FIELD OF THE INVENTION

This present invention relates to food dispensing machines such as those found in bulk food stores or candy shops. In particular, the present invention relates to an improved racking, storage and delivery system of simple, modular construction, that is suitable for operation with a wide variety of candies and other products including hardware such as nuts and low aspect ratio screws or bolts.

BACKGROUND OF THE INVENTION

Food dispensing machines have long been known. They range from coin operated devices, such as bubble gum machines, to simple open topped bins that are commonly found in bulk food stores. These bulk food bins are often prone to contamination. A scoop is usually provided in these existing systems to allow customers to scoop out a desired quantity of product. The handling of food products in this way makes bulk foods a ready ground for undesired contamination. The containers themselves may not be cleaned very frequently.

Existing bulk food bins are also cumbersome to use. Most often, the units require the user to hold open a lid or door while scooping out product from the storage area, only to have the lid shut closed while the user empties the contents of the scoop into a bag or other container. Bulk vending systems in which the lid remains in an open position create another problem—often the consumer forgets to close the lid when he or she is finished scooping out product. This enables dust, dirt and vermin access to the contents of the dispenser creating a contaminated environment.

Product may also be wasted by the consumer resulting in the loss of profitability to the merchant as the consumer may often drop product on the floor due to overfilling or mishandling of the scoop.

Conventional rack systems for bulk dispensers for displaying and dispensing candy and the like are usually made in the form of a solid shelved structures. Often, such structures are placed on a table top or counter top these structures occupy a relatively large amount of space which leaves a relatively limited area for placement of the dispensing units. Also, due to the limited open area that a conventional solid rack system provides, the candy within the containers cannot be seen very well by consumers, especially when the amount of candy left in the dispenser is low, and thus, the display function of the rack system is reduced.

Finally, dispensers on existing rack systems are awkward to refill. Usually a merchant must remove each individual dispenser from the rack to refill it on a table or on the floor. Additionally, a merchant must have a designated area to warehouse product refills.

There remains a need for a simple, bulk food dispensing apparatus and rack system that is easy to clean, not easily prone to contamination, easily refillable, and allows a user to easily dispense any amount of the product so desired.

SUMMARY OF THE INVENTION

It is an object of the present invention to provide a rack system for holding a plurality of dispensing units for displaying and dispensing candy and the like therefrom.

It is another object of the present invention to provide a rack system for holding a plurality of dispensing units that can be easily refilled and maintained.

It is still a further object of the present invention to provide a bulk vending system in which food product is dispensed in a hygienic manner.

It is still another object of the present invention to provide a bulk vending system for allowing a consumer to easily dispense product.

It is yet another object of the present invention to provide a bulk vending system which virtually eliminates wasted product due to consumer mishandling.

A still another object of the present invention is to provide a bulk vending system for displaying and dispensing a plurality of bulk dispensers in a minimum amount of floor space.

In one aspect of the present invention, a bulk vending apparatus for dispensing a user-determined amount of product stored in bulk is provided that includes a rack unit having a plurality of support structures capable of extending out from the rack unit and a plurality of dispensing units each containing a product for dispensing. The dispensing units are arranged on each of the support structures. Finally, the rack unit also includes a restraining means to restrain all but a first support structure of the plurality of support structures when a first support structure is extended from the rack unit.

In another aspect of the present invention, a vending apparatus for dispensing a user-determined amount of product stored in bulk is provided which includes a storage portion for storing loose product, and a dispensing barrel located at the bottom of the storage portion. The dispensing barrel includes a product inlet and outlet. Finally the bulk vending apparatus also includes an auger having a major diameter located within the dispensing barrel, and a brush member for brushing away excess product from the major diameter. The auger is rotatable to dispense a metered quantity of the product.

These and other features, aspects, and advantages of the present invention will become much more apparent by reference to the following detailed description and the accompanying drawings.

BRIEF DESCRIPTION OF THE DRAWINGS

FIG. 7 is a sectional view of a refill opening and door for a candy dispenser according to the present invention.

FIG. 8 is a rear view of a dispenser portion for a candy dispenser according to the present invention.

DESCRIPTION OF THE PREFERRED EMBODIMENTS

Figure 1:
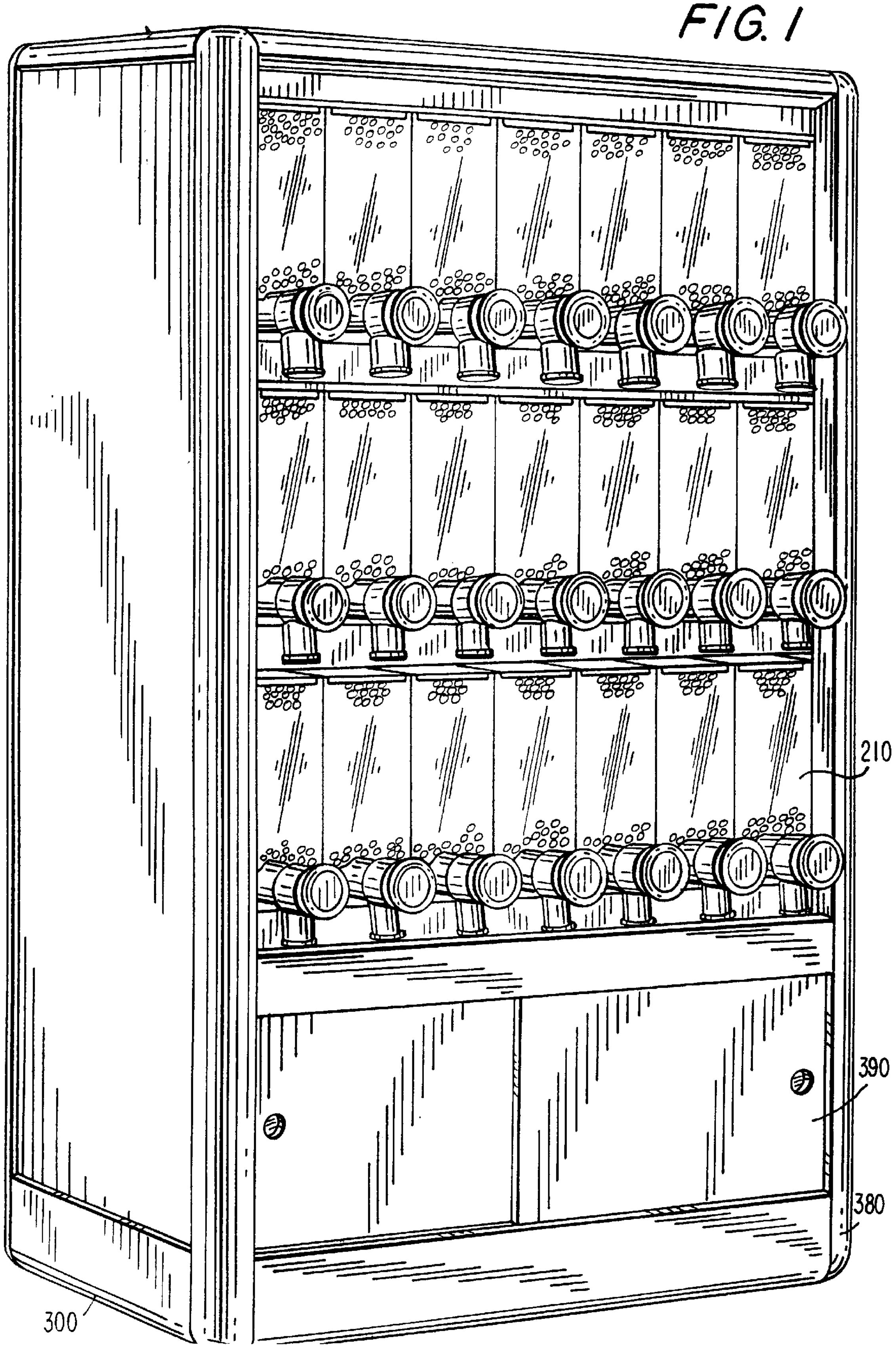
FIG. 1 is a front perspective view of a rack system according to the present invention, on which a plurality of candy dispensers are mounted.
Figure 2:
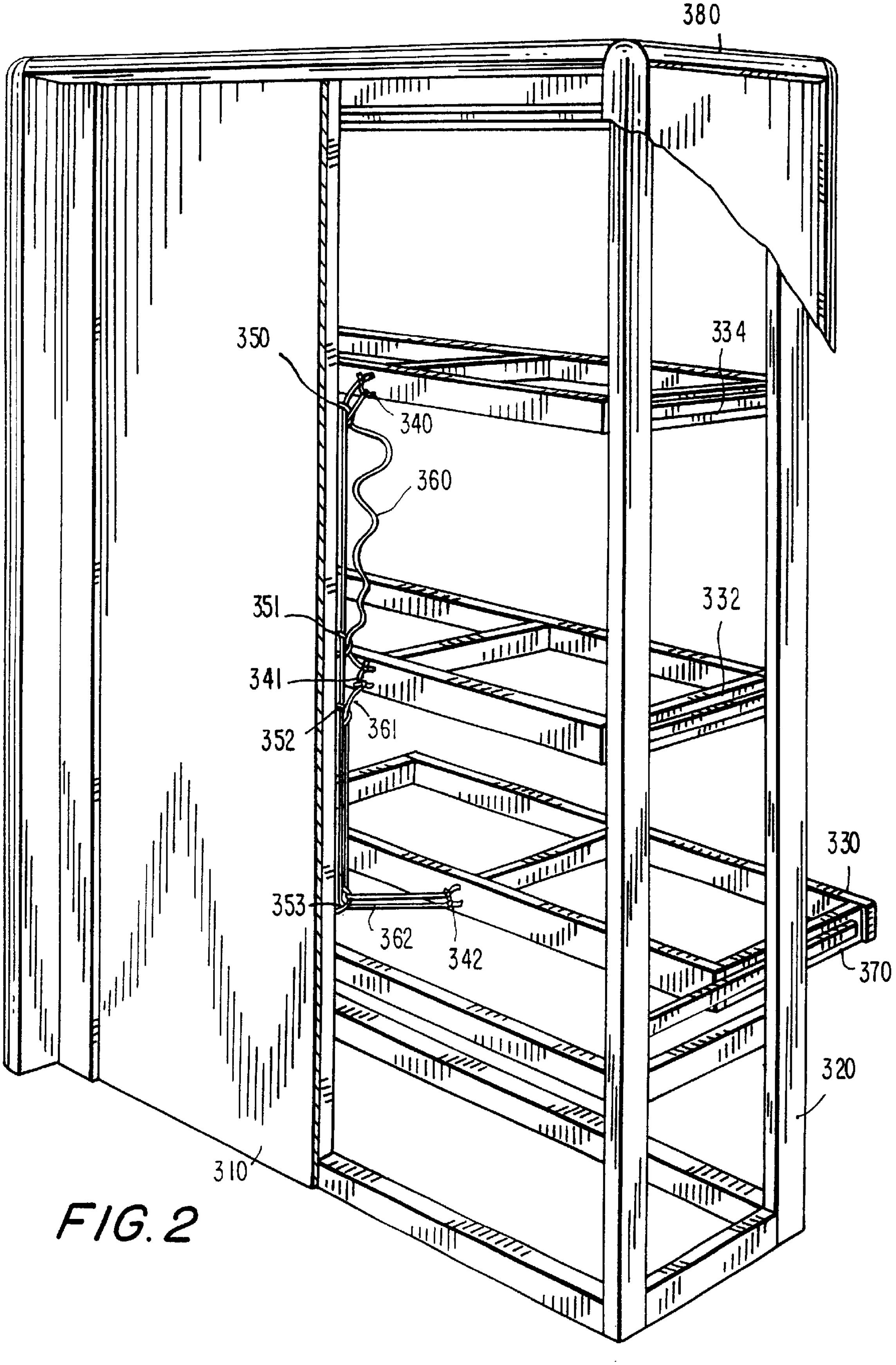
FIG. 2 is a rear sectional perspective view of a rack system illustrating a restraining system according to the present invention.
Figure 3:
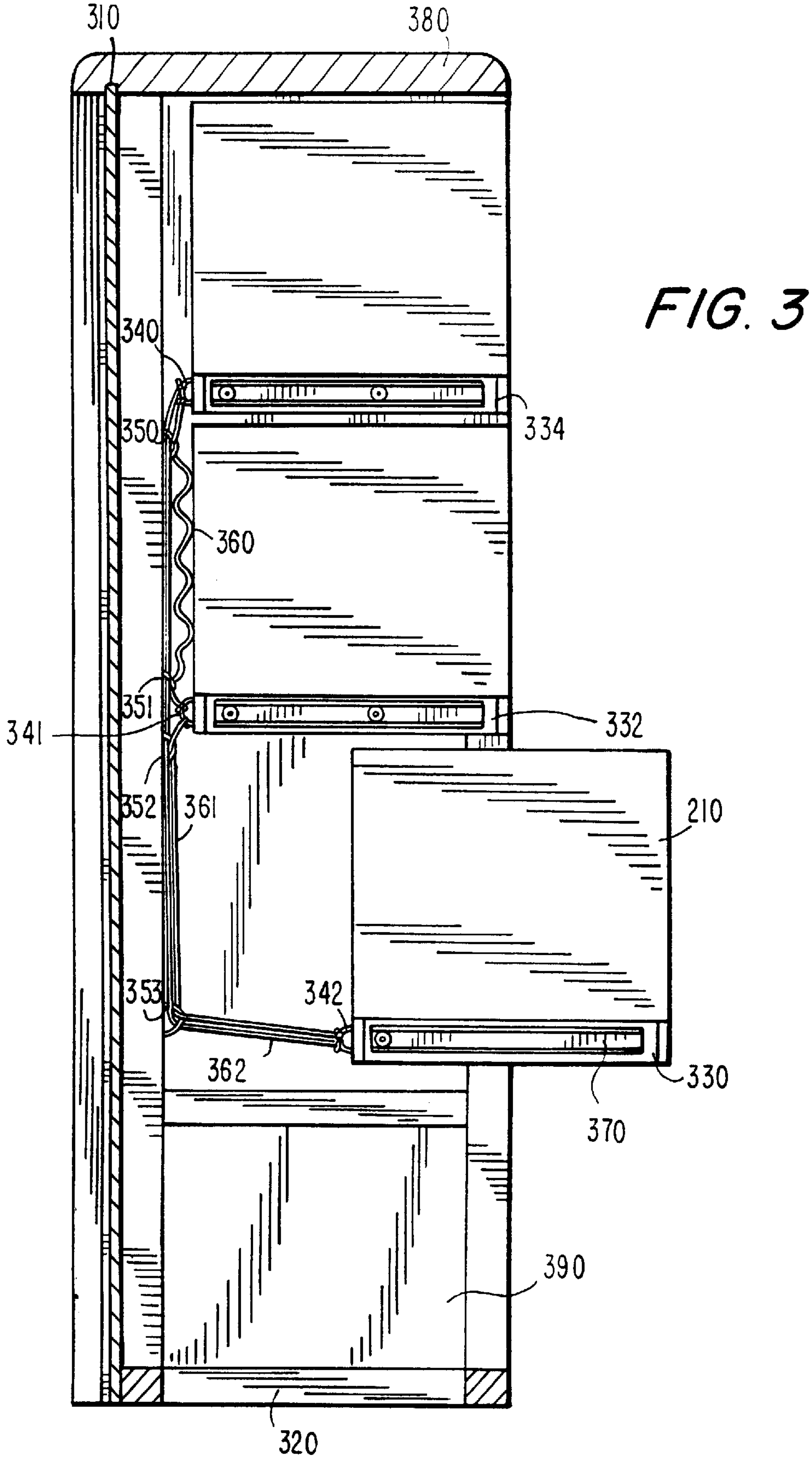
FIG. 3 is a side sectional view of a rack system illustrating a restraining system according to the present invention.

Referring to FIGS. 1–3, a structurally sound rack system 300 is shown having a framework 320, a plurality of bulk product dispensers 310, and a facade 380. The framework 320 supports shelving support members (trays) 330, 332 and 334 for supporting the bulk product dispensers 310, and a storage area 390 having doors (sliding, swinging, or in the alternative removable covers) 392 and 394. Although the current embodiment of the present invention contains three shelving support members in a horizontal position, the rack system according to the present invention may include any number of shelving support members in vertical positions also.

The framework 332, shelving support members, and facade 380 can be made from any one of a under of different materials including wood, plastic, steel, or combination thereof. The framework and shelving members are designed to be structurally rigid for their intended function.

Anchored to the framework 320 and to each shelving support member are shelving slides 370, which provide extension capability to each shelving support member. These slides enable a shelving support member to be pulled forward, away from the rack unit. In addition, the rack system includes a novel restraining system that allows only a single shelving unit at a time to be extended out from the rack system.

The restraining system includes three cables, 360, 361 and 362, whose ends are attached to the rear of each shelving support member. Each cable connects one shelf member with another as well as anchoring the shelves to the racking system. As shown in FIGS. 2 and 3, cable 360 connects shelving unit 332 with 334, passing through rear wall anchors 350 and 351; cable 361 connects shelving unit 330 with 332, passing through rear wall anchors 352 and 353; and finally, cable 362 connects shelving support member 330 with 334, and passes through rear wall anchors 350, 351, 352 and 353.

The cables may be made of steel, or an equivalent material having similar material properties. The diameter of the steel cables is determined by the cable material and the tensile load required for a cable based on the force necessary to move, and restrain the shelving support members.

The anchors located on the rear wall of the racking system may be an eye type anchor, or any type of anchor that allows a cable to be threaded through therein. Whereas the anchors affixed to the rear of each shelving support members can be any type of anchor which allows an end of a cable to be affixed thereon. These anchors can include hook and eye anchors, in which case the end of the cables must have a means of attachment thereto. Such means can include clips, hooks, and the like. As an alternative, the ends of the cable can be attached to the shelving unit anchors by welding or adhesive.

Each cable is made to a predetermined length, which allows only one shelving support member to be opened at a time. Thus, when all the shelving support members are in the closed position, cables 360, 361 and 362 have slack, which hangs freely within the backside of the rack system. However, when shelving support member 334 is in an open position, for example (i.e., is pulled out away from the rack unit 300 (and away from the back wall 310; see FIG. 3), the slack in cables 360 and 362 is taken up and the cables are placed under tension (i.e., being extended to their full predetermined length).

The length of the cables allow the shelving support member 334 to be pulled out up to a specific distance. This distance is preferably approximately equal to the width of the shelving support member, although the ultimate length of cables 360 and 362 can be designed to handle any distance that may be required to access the bulk dispensing units for refilling or maintenance.

When cables 360 and 362 are under tension, as a result of shelving support member 334 being pulled out, the remaining shelving support members 330 and 332 remain locked in place due to the tension in cables 360 and 362. The restraining system works similarly when either shelving support member 330 or 332 is open.

The purpose behind this system is to provide an easy and effective manner to refill the bulk dispensing units 310 as well as to ensure that the rack unit 300 will not tip over in the event of having too many shelving members in the open position. Accordingly, the rack unit 300 is designed so that the unit will remain stable in all conditions of operation.

For example, in a worst case scenario when, say, the bulk dispensing units 310 arranged on the upper most shelving member 334 are full, and the remainder of the bulk dispensing units 210 arranged on the other shelving support members are empty, and shelving member 334 is placed in the open position, the unit will not topple forward, even with additional weight from a merchant leaning on the shelving support member 334 when refilling the upper units.

When an open shelving support member is returned into the rack unit 300, then another of the shelving members may be opened, albeit, only one at a time.

Although the present invention includes the currently described novel restraining system, this does not limit the invention to this restraining system. Other restraining systems familiar to one skilled in the art may also be used. Such systems may include similar systems using elastic cords and springs, or a series locking levers that keep remaining shelving support members locked in a closed position when one of the shelving support members is open. In addition, electrical means and methods for ensuring that only a single draw is open are not beyond the scope of the present invention.

Figure 4:
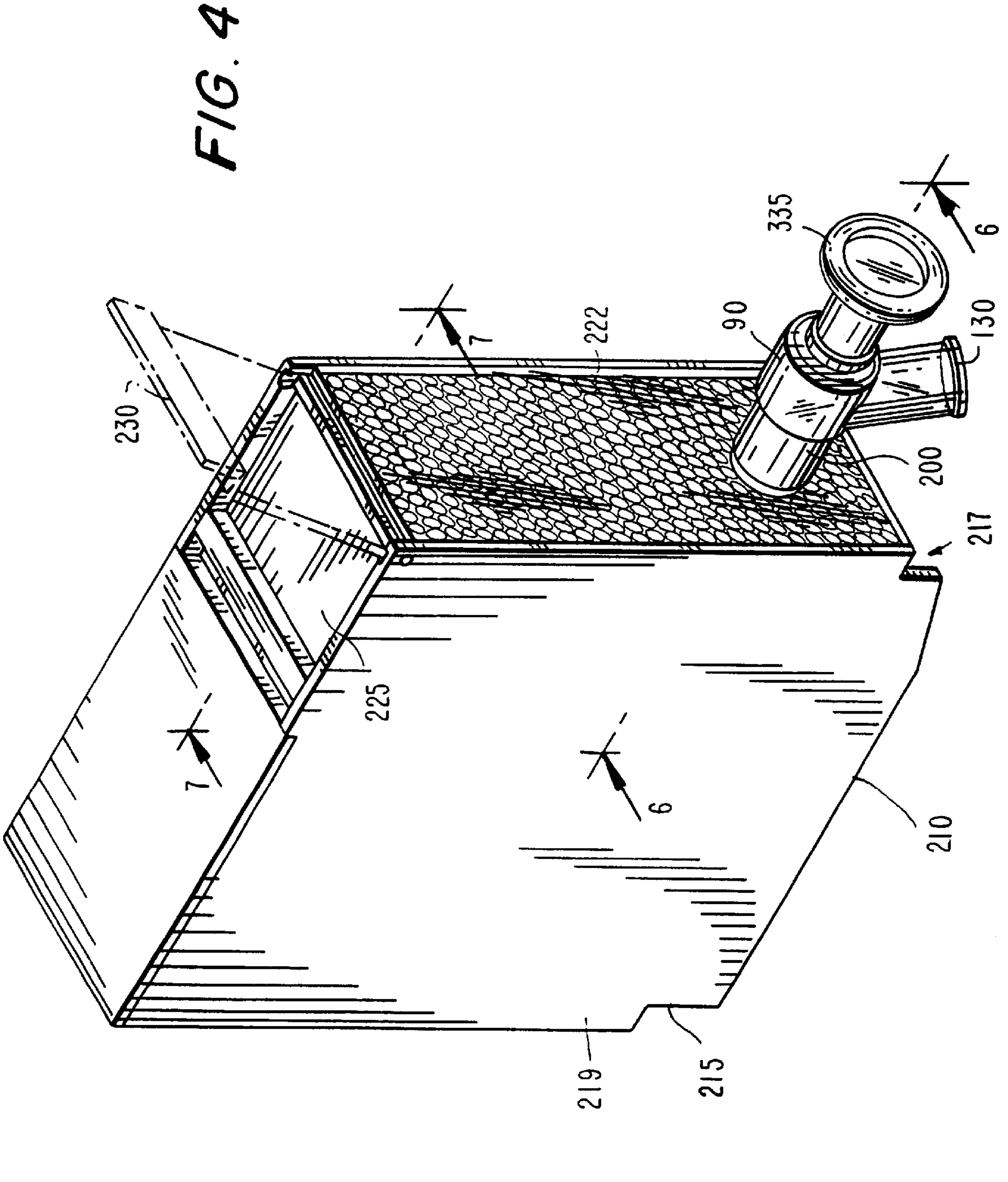
FIG. 4 is a perspective view of a candy dispenser unit according to the present invention.

FIGS. 4–12 illustrate a type of bulk dispensing unit 210 that may be used with rack system 300. Specifically, FIG. 4 shows a perspective view of bulk dispenser 210 illustrating overall housing 219. The housing 219 may be made from any number of materials including wood or steel, but preferably plastic, and may be manufactured as a single molded product, or multiple piece assembly.

The bulk dispenser unit also includes refill opening 225 having a refill door 230. The sides of the bulk dispenser housing 219 include notched areas 215 and 217 which provide an area for receiving a shelving support member, so that the dispenser unit 310 may be locked into the shelving support member for stable operation.

As shown in FIG. 4, the front wall 214 of the dispenser unit 210 is preferably comprised of a transparent material.

Figure 6:
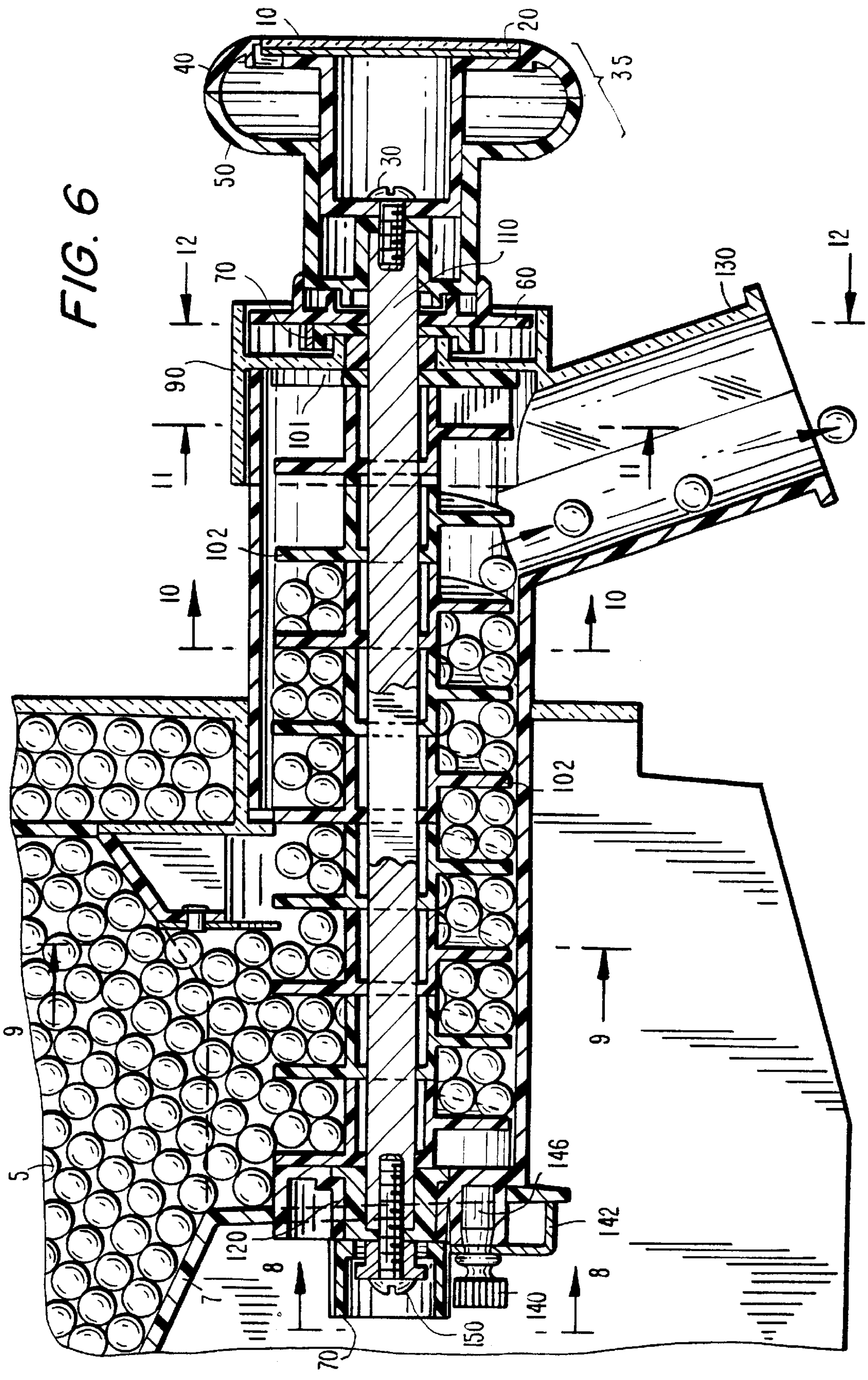
FIG. 6 is a sectional view of a dispenser portion of a candy dispenser according to the present invention.
Figure 9:
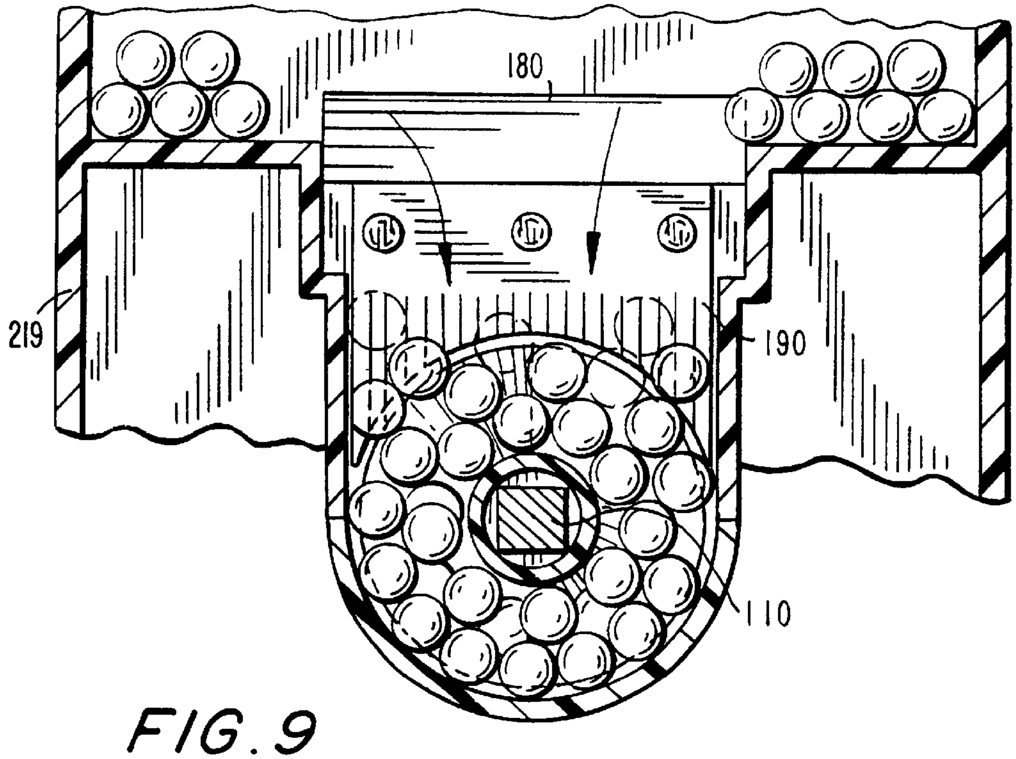
FIG. 9 is a sectional view of a dispenser portion illustrating a baffle member for a candy dispenser according to the present invention.
Figure 10:
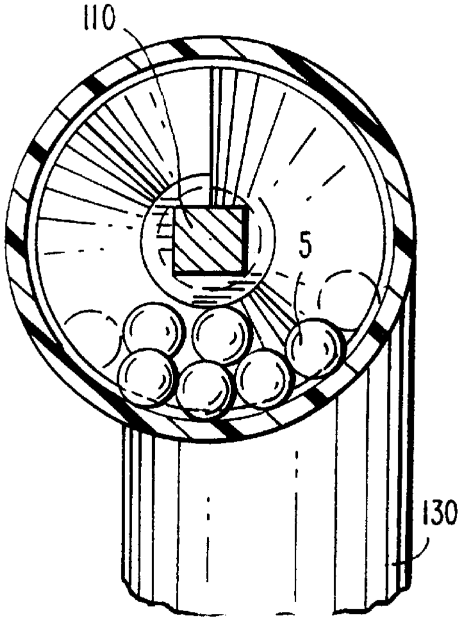
FIG. 10 is a sectional view of a middle portion of a dispenser portion for a candy dispenser according to the present invention.
Figure 11:
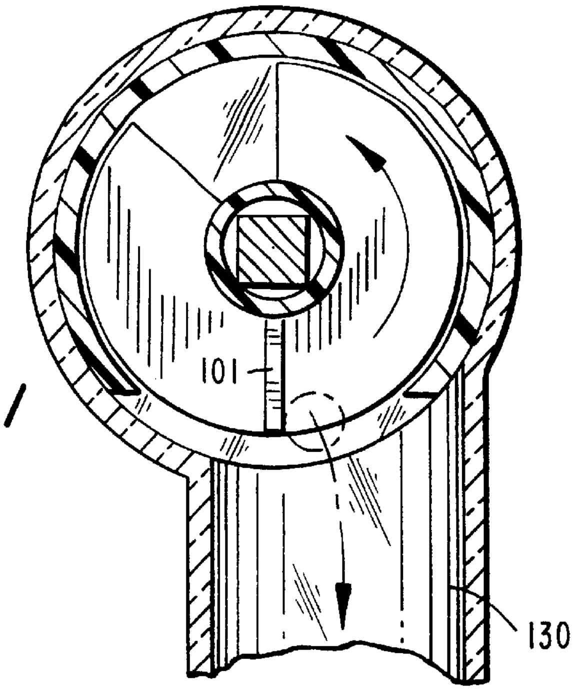
FIG. 11 is a sectional view of a spout member of a dispenser portion for a candy dispenser according to the present invention.
Figure 12:
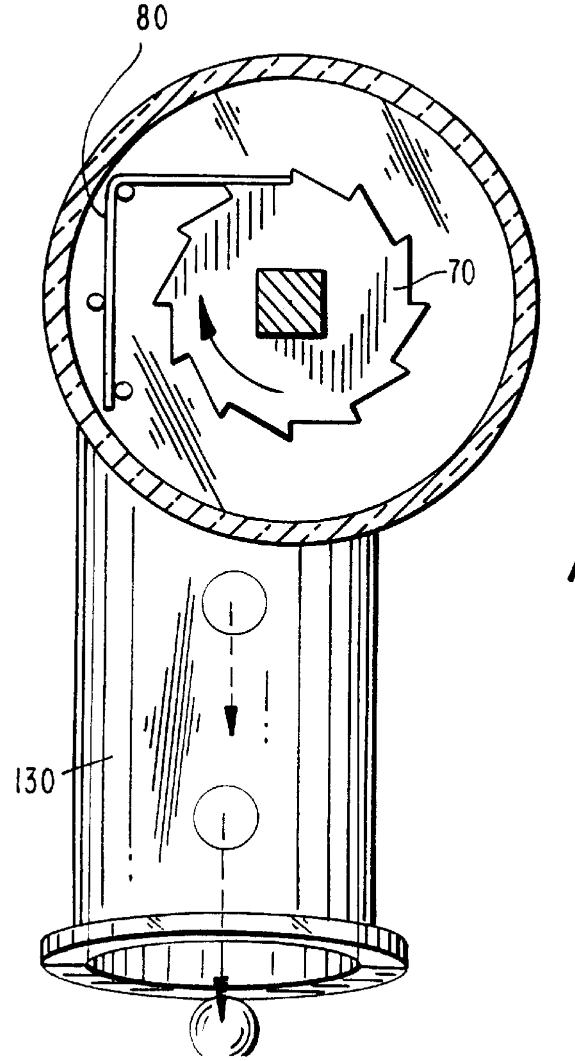
FIG. 12 is a sectional view of a front portion of a dispenser portion of a candy dispenser illustrating a ratchet mechanism according to the present invention.

This allows one to view the material contents of the dispenser unit 210, without having to open refill door 230 and peer into the dispenser unit 210 through refill opening 225. In addition, as shown in FIGS. 6 and 7, an internal wall located behind the existing front wall 214 of the housing 219 creates an internal space 213 for containing loose product. This creates a display "window" giving an "always full" view for the bulk dispensing unit 310 illustrating the product for dispensing.

Figure 5:
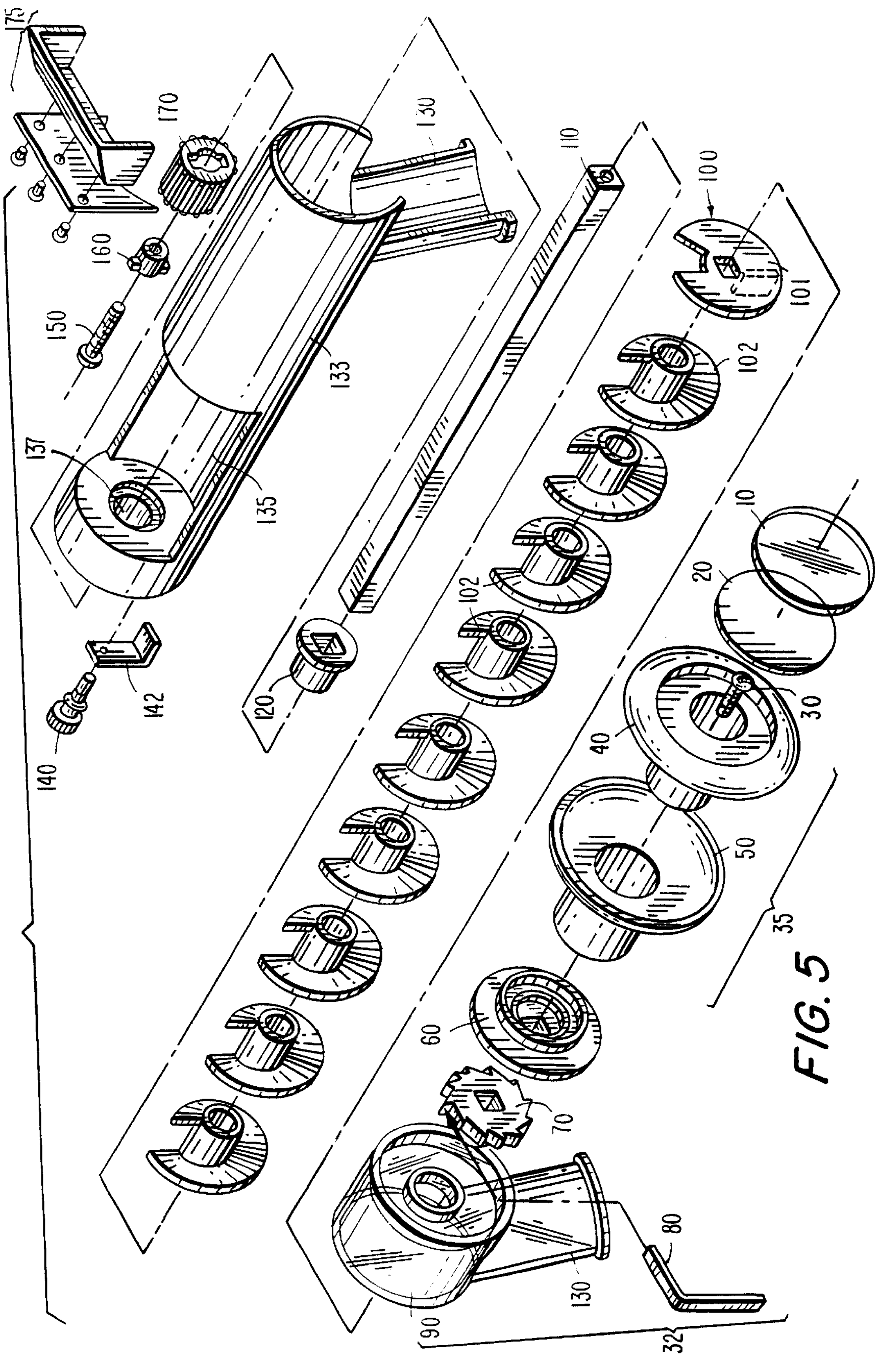
FIG. 5 is an exploded view of a dispenser portion for a candy dispenser according to the present invention.

Finally, the dispenser unit 210 includes dispensing barrel assembly 200 which dispenses the loose product contained within the housing 219 to the consumer. As shown in FIGS. 5 and 6, the dispensing barrel assembly 200 includes dispensing tube 133, having a product receiving area 135 for receiving product from the product stored in the housing 219. In the front of dispensing barrel assembly 200 is a barrel cap 90, which includes the front half of a spout 130. The back half of spout 130 is integral with dispensing barrel 133.

The main component included within the dispensing barrel assembly 200 is an auger 100, which is comprised of a plurality of individual flights 102 which are centrally assembled side by side over a shaft 110, through a central opening in each flight 102. The central opening in each flight is designed to conform to the shape of the shaft 110, so as to be radially locked onto the shaft 110. As shown in FIG. 5, the shaft 110 is in the form of a square, but can be of any shape. In addition, the auger, or auger and shaft may be manufactured as a single one-piece unit.

The auger may be exchanged with another auger-shaft assembly having a different pitch, major diameter, minor diameter, and pitch diameter of the flights. This may be done in order to compensate for different size product to be dispensed. These dimensions are limited, however, by the overall diameter of the dispensing barrel 133 and spout diameter. Preferably, the size of the flights for the present invention will be of a size for accepting a wide variety of small loose product including candy, nuts, coffee beans and the like.

At the product exit end of the auger 100 is an end cap 101 that slides over the end of shaft 110, terminating the flights 102. At the opposite end is a rear bushing 120, which is received by an opening 137 in the rear of the dispensing barrel 130, in the back wall adjacent the product receiving area 135.

The dispenser barrel 133 is capped by barrel cap 90. Immediately adjacent and located within the barrel cap 90 is a ratchet gear 70 and a ratchet spring 80. The ratchet gear 70 slides over the center shaft 110 through a conforming center portion. The ratchet allows one-way only rotation of the auger within the dispensing barrel 130. It is noted that the one-way rotation of auger 100 can also be accomplished in any number of ways including both electrical and other mechanical means.

A cap cover 60, also with central portion conforming to the shape of shaft 110, covers the ratcheting mechanism. A knob 35 including rear portion 50 and front portion 40, slides over the end of shaft 110. The knob portion is then completed with color or product designating chip 20, inserted within front knob portion 40, and sealed with transparent cover 10 to allow a consumer to view a specific characteristic (color, name, shape, size) of the product contained within the bulk dispensing unit.

Figure 13:
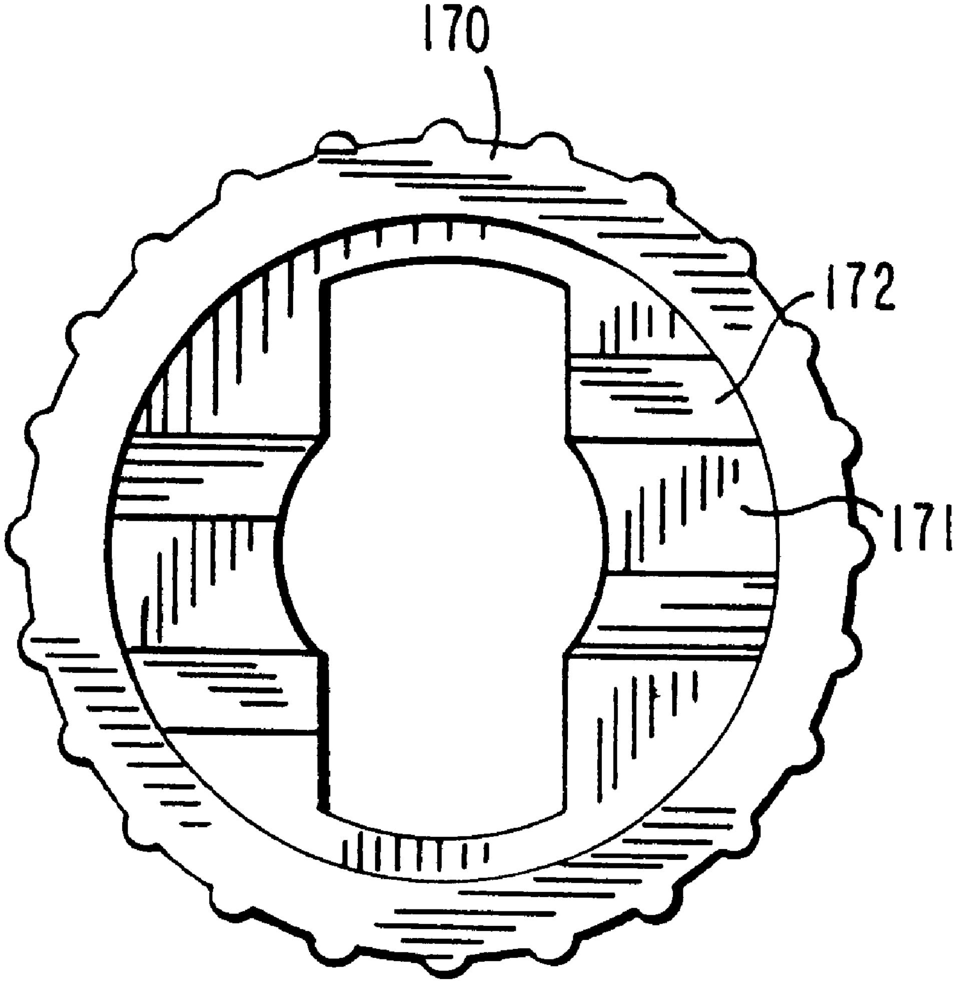
FIG. 13 is a top view of a locking knob for the dispenser portion of the present invention.

The entire dispensing barrel assembly 200 is held together by front and rear fasteners. At the rear of dispensing barrel 130, a machine screw 150 locks a locking bushing 160 and rear bushing 120 onto the center of the rear end of shaft 110. As shown in FIG. 13, the central portion of locking knob 170, having an equivalent shape of locking bushing 160, also contains an inner hub 171 and a post 172. When the locking knob 170 is slid over the locking bushing 160, a clockwise twist of the locking knob 170 moves an end of locking bushing 160 up the inner hub 171 terminating the end at post 172.

A front machine screw 30 locks the knob halves 40 and 50, the ratchet gear 70, the ratchet spring 80 and barrel cap 90 into the front end of the shaft 110. The front machine screw is hidden from view by product designating chip 20 and transparent cover 10.

The completed dispensing barrel 200 is then slid into the lower portion of the housing 210. There it is secured in place by a tab 142 and secured by a set screw 140, threaded into sonic insert 146.

Finally, a brush assembly 175 including a brush 190 secured to a brush holder 180, is located within the dispensing area of the lower portion of the housing 219 directly above the product receiving area 135. The brush assembly insures that the material to be dispensed does not jam the auger at the front edge of the product receiving area 135, by "brushing" excess product away from the intersection of the auger and product receiving area 135. The excess material brushed away is swept back into the preceding flight.

The operation of the dispenser unit 210 is as follows. As shown in FIG. 6, product 5 fills the storage area of the housing 219, and is funneled down into the product receiving area 132 of dispensing barrel 130 by a sloped floor 7 and the brush assembly 175. As a consumer turns knob 35 clockwise, the auger 100 also rotates clockwise. The primary function of the rachet assembly is to keep the auger from rotating in the opposite direction, i.e., counter clockwise. In addition, the speed of the auger can be limited somewhat by the pressure of the ratchet spring 80 on the ratchet gear 70. This creates a "clicking" sound as one rotates the handle.

Due to gravity, product 5 fills the voids in each of the exposed individual flight of auger 100. The product 5 is carried down the auger 100 by the clockwise rotation of knob 35. As the product 5 passes the individual flights located directly below brush 190, excess product located above the top part of the screw thread is brushed back to be funneled into the preceding flights of auger 100 located toward the rear of the product receiving area 135.

Product is moved along the length of auger 100 where it exits the dispensing barrel at the flights 102 located above exit spout 130.

The assembly allows the user to obtain as much or as little product as desired by rotating the auger a large or small amount, respectively. In addition, the speed of the product exiting the dispensing barrel 200, although somewhat limited by the ratcheting mechanism, can be user-determined by rotating the knob 35 in a fast or slow fashion.

When the amount of product has been exhausted in the storage area of the dispensing unit housing 219, the unit may be refilled with more product. However, prior to refilling, the dispensing barrel may be removed for cleaning and maintenance by removing retaining screw 140 and tab 142 and sliding the unit out from the base of the housing.

When no more product appears after repeated rotations of the knob 35, the unit requires refilling. As shown in FIGS. 3 and 7, the storage area of the dispensing unit 210 is refilled by sliding the appropriate shelving support member to the open position, and lifting lid 230 to expose the opening 225 located above the storage area. The merchant can then place product into the storage area through the opening 225, and, depending upon the popularity of the product, fill the storage area to a desired level. The lid 230 is then closed or replaced and the shelving support member returned to the closed position.

What is claimed is:

1. A bulk vending apparatus for dispensing a user-determined amount of product stored in bulk comprising:

a rack unit comprising a plurality of support structures capable of extending out from said rack unit;

a plurality of dispensing units each containing a product for dispensing, said dispensing units arranged on said support structures and comprising a storage portion and a removable dispensing barrel located within the bottom of said storage portion, a first end of said barrel being removably fastened to said storage portion and having an inlet positioned adjacent the first end, a second end of said barrel having an outlet for dispensing product adjacent the second end, said barrel having an auger positioned therein, and a restraining member associated with each support structure to restrain all but a first support structure of said plurality of support structures when a first support structure is extended from said rack unit.

2. A bulk vending apparatus according to claim 1, wherein said each said dispensing unit includes a housing adapted for interconnecting with said support structure.

3. A bulk vending apparatus according to claim 1, wherein each said dispensing unit includes a refill portion for refilling product.

4. A bulk vending apparatus according to claim 3, said apparatus further comprising a closure member for closing said refill portion.

5. A bulk vending apparatus according to claim 1, said restraining member comprising:

a plurality of cables; and an anchoring system, said plurality of cables being connected via said anchoring system to each of said support structures and said rack unit, and said cables attached to said rack first support structure are placed under tension when said first support structure is extended from said rack unit thereby locking said remaining plurality of support structures within said bulk vending apparatus.

6. A bulk vending apparatus according to claim 5, wherein said anchoring system comprises a first set of anchors affixed to the rear portion of each of said plurality of shelving support members and a second set of anchors affixed to the inside of a rear wall of said rack unit proximately located to said first set of anchors.

7. A bulk vending apparatus according to claim 1, said apparatus further comprising a storage area for storing product to refill said dispensing units.

8. A bulk vending apparatus according to claim 1, wherein said support structures are horizontal.

* * * * *

UNITED STATES PATENT AND TRADEMARK OFFICE

CERTIFICATE OF CORRECTION

PATENT NO. : 6,293,434 B1
DATED : September 25, 2001
INVENTOR(S) : M. Jeffrey Ellis et al.

It is certified that error appears in the above-identified patent and that said Letters Patent is hereby corrected as shown below:

Column 1,
Line 45, "top these" should read -- top. These --.

Column 3,
Line 28, "under" should read -- number --.

Signed and Sealed this

Thirtieth Day of April, 2002

Attest:

JAMES E. ROGAN
*Director of the United States Patent and Trademark Office*

*Attesting Officer*